United States Patent [19]
Brecht et al.

[11] Patent Number: 5,914,362
[45] Date of Patent: Jun. 22, 1999

[54] SILICONE-BASED ANTIFOAM COMPOSITIONS CROSS-REFERENCE TO RELATED APPLICATIONS

[75] Inventors: Doris Jean Brecht, Sumner; Russell Allen Elms, Midland; Kenneth Christopher Fey, Midland; Ronald Paul Gee, Midland, all of Mich.

[73] Assignee: Dow Corning Corporation, Midland, Mich.

[21] Appl. No.: 08/960,653

[22] Filed: Oct. 30, 1997

Related U.S. Application Data

[63] Continuation-in-part of application No. 08/635,043, Apr. 19, 1996, Pat. No. 5,777,059, application No. 08/635,119, Apr. 19, 1996, application No. 08/635,346, Apr. 19, 1996, and application No. 08/789,143, Jan. 28, 1997, Pat. No. 5,861, 453, which is a continuation-in-part of application No. 08/635,347, Apr. 19, 1996, abandoned.

[51] Int. Cl.$^6$ ............................................ C08K 5/54
[52] U.S. Cl. .................... 524/268; 524/588; 524/731; 524/863; 252/321; 252/358
[58] Field of Search ........................ 524/863, 731, 524/588, 268; 252/321, 358

[56] References Cited

U.S. PATENT DOCUMENTS

| | | | |
|---|---|---|---|
| 3,959,175 | 5/1976 | Smith, Jr. et al. | 252/321 |
| 4,639,489 | 1/1987 | Aizawa et al. | 524/588 |
| 4,690,713 | 9/1987 | Terae et al. | 106/287.16 |
| 4,749,740 | 6/1988 | Aizawa et al. | 524/588 |
| 4,983,316 | 1/1991 | Starch | 252/174.15 |
| 5,777,059 | 7/1998 | Datz-Siegel et al. | 528/14 |

*Primary Examiner*—Margaret W. Glass
*Attorney, Agent, or Firm*—Arne R. Jarnholm

[57] ABSTRACT

A silicone-based antifoam composition, in the form of an emulsion, is prepared from the reaction of (A) a primary silicone composition and (B) a polydiorganosiloxane having condensable terminal groups in a nonpolar organic medium selected from the group consisting of polyisobutylene and mineral oil. The reaction of the primary silicone composition (A) and the polydiorganosiloxane (B) produces a secondary silicone composition, which forms the discontinuous phase of the emulsion and the nonpolar organic medium forms the continuous phase of the emulsion. The resulting composition of the invention exhibits antifoam efficacy greater than that of the primary silicone composition.

12 Claims, No Drawings

SILICONE-BASED ANTIFOAM COMPOSITIONS CROSS-REFERENCE TO RELATED APPLICATIONS

CROSS-REFERENCE TO RELATED APPLICATIONS

The present application for patent is a continuation-in-part of U.S. patent application Ser. Nos. 635,043, (now U.S. Pat. No. 5,777,059), 635,119 and 635,346, all of which were filed on Apr. 19, 1996, and U.S. patent application Ser. No. 789,143, (now U.S. Pat. No. 5,861,453), filed on Jan. 28, 1997, which is a continuation-in-part of U.S. patent application Ser. No. 635,347, also filed on Apr. 19, 1996 and now abandoned.

BACKGROUND OF THE INVENTION

1. Field of the Invention

The present invention relates to generally to silicone compositions that are useful for controlling foam formation in foaming media. More particularly, the present invention relates to such antifoam compositions in the form of an emulsion, wherein a discontinuous silicone phase is dispersed in a nonpolar organic continuous phase.

2. Description of the Prior Art

Silicone compositions, useful as foam control agents and which are prepared by a reaction of several components, have been disclosed. For example, Aizawa et al., in U.S. Pat. Nos. 4,639,489 and 4,749,740, teach a method for producing a silicone defoamer composition wherein a complex mixture of polyorganosiloxanes, filler, a resinous siloxane and a catalyst are heated together at 50° C. to 300° C. The drawback of the compositions of Aizawa et al. is that the cost to manufacture the composition is quite high.

Terae et al., in U.S. Pat. No. 4,690,713, disclose an antifoam composition comprising (a) 100 parts by weight of a hydrocarbon oil, such as a spindle oil or silicone fluid (e.g. a polydimethylsiloxane fluid having a viscosity of 20 to 1,000,000 mm$^2$/sec at 25° C.), (b) 0.1 to 40 parts by weight of an organosilane compound having 1 to 3 hydroxy groups or hydrolyzable groups (such as alkoxy, acyloxy, and alkenyloxy groups), and(c) 1 to 40 parts by weight of a finely divided silica powder and optionally a catalyst.

Starch, in U.S. Pat. No. 4,983,316 discloses a dispersible antifoam composition for providing controlled foaming liquid laundry detergent formulations, wherein there is provided a non-aqueous emulsion of primary and secondary silicone antifoam agents, at least one nonionic silicone surfactant for emulsifying the primary and secondary antifoaming agents in a solvent, a first organic surfactant dispersing agent for assisting in dispersing the emulsified primary and secondary antifoaming agents in the liquid laundry detergents, and a second dispersing agent of a nonionic difunctional block-copolymer terminating in primary hydroxyl groups for further assisting in dispersing the emulsified primary and secondary antifoam agents in the liquid laundry detergent. A liquid laundry detergent composition containing the composition described immediately above is also disclosed. A drawback of this composition is the high cost associated with manufacture. Another drawback is that the active antifoam agent needs to be diluted for stability and delivery to the foaming medium. Such dilution causes the performance to suffer proportionately.

Silicone compositions which contain polybutylene or polyisobutylene compounds have also been disclosed. For example, Smith et al. in U.S. Pat. No. 3,959,175 discloses a defoamer based on a mixture of polyisobutylene and a high melting point hydrophobic component such as a fatty amide, fatty acid, or tri-glyceride, a mixture of the polyisobutylene and a hydrophobic material such as treated silica powder, or a combination of the two mixtures. It is well-known that antifoam agents of this type, however, do not offer the long-term performance seen in silicone-based antifoam agents.

SUMMARY OF THE INVENTION

The present inventors have overcome the drawbacks of the prior art in that they provide a relatively low cost silicone-based antifoam composition in the form of an emulsion. The emulsion includes a nonpolar organic medium selected from the group consisting of polyisobutylene and mineral oil to aid in the delivery and stability of the active antifoam agent. The present invention, however, compensates for the attendant loss in performance attributable the dilution of the compositions such as those of Aizawa et al.

In accordance with the method of the present invention, (A) a primary silicone composition, i.e. a composition identical to or very similar to that taught by Aizawa et al. is first prepared. Thereafter, about 5 to 25 parts, by weight, of (A) the primary silicone composition, about 10 to 50 parts, by weight of (B) a polydiorganosiloxane having condensable terminal groups and a viscosity of about 10 to 50,000 mm$^2$/sec and (C) a catalytic amount of a second condensation catalyst are dispersed in about 25 to 80 weight parts of (D) the nonpolar organic medium selected from the group consisting of polyisobutylene and mineral oil, per 100 parts of the combined weights of (A), (B) and (D). The dispersion is carried out under conditions of shear and (A) the primary silicone composition and (B) the polydiorganosiloxane then react, through condensation, to produce a secondary silicone composition. The final composition of the invention is an emulsion, wherein the secondary silicone composition appears as the dispersed or discontinuous phase and wherein (D) the nonpolar organic medium is the continuous phase.

DETAILED DESCRIPTION OF THE INVENTION

In accordance with the silicone-based antifoam composition of the present invention, (A) a primary silicone composition is first prepared.

The primary silicone composition is the reaction product, formed at a temperature of 50° C. to 300° C., of a mixture comprising:

(i) 1 to 100 parts by weight of a diluent selected from the group consisting of polydiorganosiloxane, polyisobutylene and mineral oil;

(ii) 5 to 100 parts by weight of a polyorganosiloxane having a viscosity of 200 to several million mm$^2$/s at 25° C. expressed by the general formula $R^1_a(R^2O)_b SiO_{(4-a-b)/2}$ in which $R^1$ is a monovalent hydrocarbon or halogenated hydrocarbon group having 1 to 10 carbon atoms, $R^2$ is hydrogen or a monovalent hydrocarbon group having 1 to 10 carbon atoms, a has an average value of 1.9 to 2.2 and b has a sufficiently large value to give at least one —$OR^2$ group in each molecule, at least one such —$OR^2$ group being present at the end of the molecular chain;

(iii) 0.5 to 20 parts by weight for every 100 parts by weight of the combined weight of components (i) and (ii) of at least one silicon compound selected from the group consisting of (a) an organosilicon compound of the general formula $R^3_c SiX_{4-c}$ in which $R^3$ is a monovalent hydrocarbon group having 1 to 5 carbon atoms, X is selected from a halogen atom or a hydrolyzable group and c has an average value of one or less, (b) a partially hydrolyzed condensate of said compound (a), (c) a siloxane resin comprising $(CH_3)_3SiO_{1/2}$ units and $SiO_{4/2}$ units wherein the ratio of $(CH_3)_3SiO_{1/2}$ units to $SiO_{4/2}$ units is 0.4:1 to 1.2:1, or (d) a condensate of said compound (c) with said compound (a) or (b); and (iv) a catalytic amount of a first condensation catalyst.

Preparation of the primary silicone composition (A) may be carried out according to the teachings of Aizawa et al., in U.S. Pat. Nos. 4,639,489 and 4,749,740, incorporated herein by reference for such teachings. It has been discovered, however, that contrary to the teachings of Aizawa et al., the use of a finely divided filler (v), such as precipitated or fumed silica, is optional and not necessary in order to produce a useful antifoam agent. Likewise, Aizawa et al. teach that the diluent (i), referred to above, should be a nonreactive polydiorganosiloxane. It has been discovered that other diluents, such as mineral oil and polyisobutylene, may be used which still render useful antifoam agents. These differences from the teachings of Aizawa et al. are set forth in copending U.S. patent application Ser. Nos. 635,043, 635,119 and 635,346, all of which were filed on Apr. 19, 1996, and U.S. patent application Ser. No. 789,143, filed on Jan. 28, 1997, which is a continuation-in-part of U.S. patent application Ser. No. 635,347, also filed on Apr. 19, 1996 and now abandoned, each of which is incorporated herein, by reference, for such teachings.

In accordance with the teachings of Aizawa et al., The (i) diluent of (A) the primary silicone composition is preferably a predominantly linear silicone composition of the general formula $R^1_a SiO_{(4-a)/2}$ wherein a has a value ranging from about 1.9 to 2.2 and each $R^1$ is independently a hydrocarbon group having from one to ten carbon atoms. Most preferably, $R^1$ is methyl. When the diluent is a polysiloxane, the viscosity may range from 20 to 100,000 mm$^2$/sec, and more preferably from 350 to 15,000 mm$^2$/sec at 25° C.

It should be noted that, when (i) the diluent is a polydiorganosiloxane, the siloxane is substantially free of hydroxyl groups. The function of (i) the diluent is simply to provide a solvent medium to augment reaction of the remaining components (ii) through (iv) of (A) the primary silicone composition. Examples of preferable non-siloxane diluents include low molecular weight polyisobutylene and mineral oil.

The next component of the primary silicone composition is (ii) 5 to 100 parts by weight of a polyorganosiloxane having a viscosity of 200 to about 100 million mm$^2$/s at 25° C. expressed by the general formula $R^1_a(R^2O)_b SiO_{(4-a-b)/2}$. $R^1$ is a monovalent hydrocarbon or halogenated hydrocarbon group having 1 to 10 carbon atoms, $R^2$ is hydrogen or a monovalent hydrocarbon group having 1 to 10 carbon atoms, a has an average value of 1.9 to 2.2 and b has a sufficiently large value to give at least one —OR$^2$ group in each molecule and at least one such —OR$^2$ group is present at the end of the molecular chain. When $R^2$ is a hydrocarbon, specific examples are the same as $R^1$. Hence, component (ii) of the primary silicone composition is a predominantly linear polysiloxane molecular chain having a condensable or hydrolyzable group present at at least one end of the chain.

In the general formula for component (ii) given above, it is preferable that b is sufficiently large to give at least two OR$^2$ groups per molecule, wherein the OR$^2$ groups are hydroxy groups.

Component (iii) is a silicon compound selected from the group consisting of (a) through (d), outlined above. Component (iii) is, in fact, a cross-linking compound, having hydrolyzable or condensable groups associated therewith. Thus, the purpose of component (iii) is to react with component (ii) the polyorganosiloxane, via hydrolysis/condensation reaction in the presence of the condensation catalyst (iv).

Component (iii) (a) is of the general formula $R^3_c SiX_{4-c}$ in wherein each $R^3$ is independently a monovalent hydrocarbon group having 1 to 5 carbon atoms, X is selected from the group consisting of a halogen atom or a hydrolyzable group and c has an average value of one or less. Thus, suitable examples of (a) include well known silicon compounds such as $CH_3Si(OCH_3)_3$, $CH_3Si(OC_2H_5)_3$ and $Si(OC_2H_5)_4$. Component (iii) (b) is merely a partially hydrolyzed condensate of (iii) (a), the formation of which is well-known in the art.

Component (iii) (c) is a siloxane resin which includes $(CH_3)_3SiO_{1/2}$ units (M) and $SiO_{4/2}$ units (Q), wherein the ratio of $(CH_3)_3SiO_{1/2}$ units to $SiO_{4/2}$ units is 0.4:1 to 1.2:1. Those skilled in the art will recognize that component (iii) (c) is frequently referred to as an MQ resin. The production of MQ resins is well-known and usually utilizes the acid-catalyzed hydrolysis/condensation of silicate salts.

It is also well-known in the silicone art that the synthesis of MQ resins results in a molecule that includes a multitude of residual non-sterically hindered silicon-bonded hydroxy groups. These non-sterically hindered residual hydroxy groups provide a convenient site for a condensation reaction with component (ii) the polyorganosiloxane. Likewise, component (iii) (d), a condensate of component (iii) (c), includes these non-sterically hindered residual silicon-bonded hydroxy groups.

Hence, in order to form (A) the primary silicone compound, cross-linking of component (ii) can be carried out with (iii) a silicon compound selected from the group consisting of: (a) a hydrolyzable silane, (b) a partially hydrolyzed condensate of (a), (c) an MQ resin or (d) a condensate of (c), in the presence of (iv) a catalytic amount of a condensation catalyst.

Component (iv), the first condensation catalyst is also well-known in the art. Examples include alkali metal hydroxides, alkali metal silanolates and quaternary ammonium hydroxides. Other examples include strong acids, such as HCl and $H_2SO_4$.

Optionally, (A) the primary silicone composition, may include component (v), a finely divided filler, such as fumed silica, alumina or titania. Such finely divided filler serve to improve the efficacy of the antifoam agent.

The primary silicone composition also preferably includes (vi) 1 to 20 parts by weight for every 100 parts by weight of the combined weight of components (i) and (ii) of a polyorganosiloxane having a viscosity of 5 to about 200 mm$^2$/s at 25° C. expressed by the general formula $R^4_e(R^5O)_f SiO_{(4-e-f)/2}$ in which $R^4$ is a monovalent hydrocarbon or halogenated hydrocarbon group having 1 to 10 carbon atoms, $R^5$ is hydrogen or a monovalent hydrocarbon group having 1 to 10 carbon atoms, e has an average value of 1.9 to 2.2 and f has a sufficiently large value to give at least two —OR$^5$ groups in each molecule at the end of a molecular chain. This lower viscosity silicone has high condensation reactivity and promotes the reaction required for formation of component (A).

Component (A), the primary silicone composition is made by thoroughly admixing components (i) through (iv) and heating to the desired reaction temperature. The reaction proceeds until a viscosity of between about 2,000 and about 20,000 mm$^2$/sec is reached. Thereafter a finely divided filler (v) and/or the low viscosity polydiorganosiloxane of component (vi) may optionally be added. The finely divided filler (v) and component (vi) should be uniformly dispersed in the mixture of components (i) through (iv) by utilizing an appropriate device, such as a colloid mill or homomixer. The resulting mixture is then heated to a temperature of between 50° C. and 300° C. and allowed to react for about one to eight hours, depending upon temperature. Finally, the first condensation catalyst (iv) is neutralized, as explained below.

In accordance with the present invention, about 5 to 25 weight parts of (A) the primary silicone composition, about 10 to 50 weight parts of (B) a polydiorganosiloxane having condensable terminal groups and a viscosity of about 10 to 50,000 mm$^2$/sec at 25° C., and (C) a catalytic amount of a second condensation catalyst are dispersed in about 25 to 80 weight parts of (D) a nonpolar organic medium selected from the group consisting of polyisobutylene and mineral oil, per 100 weight parts of the combined weights of (A), (B) and (D), and permitted to react.

Component (B), the polydiorganosiloxane having condensable terminal groups may have a viscosity of about 10 to 50,000 mm$^2$/sec, and preferably about 20 to 2,000 mm$^2$/sec at 25° C. Suitable condensable terminal groups include alkoxy and hydroxy groups. Examples of component (B) include hydroxy-terminated methylphenylpolysiloxanes, polydimethylsiloxanes and copolymers of the aforesaid.

Component (C) is a second condensation catalyst. As previously mentioned, condensation catalysts are well-known in the art and include alkali metal hydroxides, alkali metal silanolates and quaternary ammonium hydroxides, as in the case of the catalyst (iv) of component (A), and even H$_2$SO$_4$. Component (C) is, however, preferably a surface active condensation catalyst. As used herein, the term "surface active condensation catalyst" means a material which includes at least one group with an affinity for polar materials and at least one group with an affinity for nonpolar materials. It is believed that because component (D) is a nonpolar organic medium, and because the combination of the primary silicone composition (A) and (B) the polydiorganosiloxane is polar, the surface active catalyst (C) orients itself very favorably during the reacting step of components (A) and (B). Examples of surface active catalysts include dinonylnaphthalene sulfonic acid, such as Nacure® 1052, from King Industries, Inc. of Norwalk, Conn., and benzene sulfonic acid derivatives, such as Aristonic® Acid H (C$_{20}$) and Aristonic® Acid L (C$_{16}$) both from Pilot Chemical Co. of Santa Fe Springs, Calif.

It should be noted that other condensation catalysts, such as strong bases including KOH and NaOH, can be employed.

It should be further noted that only a catalytic amount of (C) the condensation catalyst is required to produce the compositions of the present invention. As used herein, the term catalytic amount means an amount that will permit the reaction between component (A) the primary silicone composition, and component (B) the polydiorganosiloxane having condensable terminal groups, to form the secondary silicone composition in a reasonable time, such as several minutes and up to several hours. This same definition is also applied in the previously described procedures for making component (A), the primary silicone composition. Typically, the amount of condensation catalyst employed varies depending upon its strength, from about 0.5 to about 2 weight percent of the sum of the weights of components (A), (B) and (D).

Component (D) is a nonpolar organic medium selected from the group consisting of mineral oil and polyisobutylene media. It should be noted that the diluent (i) of the primary silicone composition (A) may be the same as component (D).

The term "mineral oil," as used herein, refers to hydrocarbon oils derived from carbonaceous sources, such as petroleum, shale, and coal, and equivalents thereof. The mineral oil of components (i) or (D) can be any type of mineral oil, many of which are commercially available, including heavy white mineral oil which is high in paraffin content, light white mineral oil, petroleum oils such as aliphatic or wax-base oils, aromatic or asphalt-base oils, or mixed base oils, petroleum derived oils such as lubricants, engine oils, machine oils, or cutting oils, and medicinal oils such as refined paraffin oil. The above mentioned mineral oils are available commercially at a variety of viscosities from Amoco Chemical Company (Chicago, Ill.) under the tradename Amoco White Mineral Oil, from Exxon Company (Houston, Tex.) under the tradenames Bayol™, Marcol™, or Primol™, or from Lyondell Petrochemical Company (Houston, Tex.) under the trade name Duoprime® Oil. Preferably the mineral oil has a viscosity less than about 15 mm$^2$/sec at 25° C.

Polyisobutylene is a compound. The compound may be a polyisobutylene polymer or a polyisobutylene oligomer. Such oligomers or polymers are known in the art and many are available commercially in a variety of molecular weights and endgroup combinations.

When components (i) or (D) of the invention are a polyisobutylene compound, it is preferable that it have a number average molecular weight (M$_n$) less than about 400. This corresponds to a viscosity of roughly 200 mm$^2$/sec or less. When the viscosity of components (i) or (D) exceeds about 200 mm$^2$/sec, the antifoam composition of the invention tends to become unstable over time. Nonetheless, such unstable antifoam compositions are still useful if employed shortly after preparation.

The polyisobutylene compound may have fully saturated end groups or it may have at least one terminal group which contains a functional group such as an epoxy, methylpropenyl, halide, alkoxyphenylene, hydroxyl, carboxyl, chlorosilyl, vinyl, succinic anhydride, isocyanato, amino or amido group. The polyisobutylene compound preferably has fully saturated end groups, where the end group is for example an alkyl group, or has at least one terminal group which contains an unsaturated group. Preferred polyisobutylene compounds for component (II) have either two fully saturated end groups or have one vinyl or methylpropenyl end group and one saturated end group. Preferably the end groups are independently selected from —C(CH$_3$)$_3$, —CH$_2$C(CH$_3$)$_2$H, —CH=C(CH$_3$)$_2$(2-methylpropenyl), or —CH=CH$_2$ (vinyl).

The above mentioned polyisobutylenes are available commercially in a variety of molecular weights from the Amoco Chemical Company (Chicago, Ill.) under the trade name Indopol™, or from the Polyesther Corporation (Southhampton, N.Y.) under the trade name Polysynlane™.

When components (A) through (D) are thoroughly mixed under conditions of shear, the primary silicone composition (A) reacts with component (B) the polydiorganosiloxane having condensable terminal groups, in the presence of (C) the condensation catalyst, to produce a new, secondary silicone composition. The secondary silicone composition is dispersed as the discontinuous phase of an emulsion, in which emulsion component (D), the nonpolar organic medium, selected from the group consisting of polyisobutylene and mineral oil, forms the continuous phase. Mixing under conditions of shear is preferably carried out at room temperature until the viscosity of the reaction product so-produced reaches a desired value, preferably about 10,000 to 30,000 mm$^2$/sec. Mixing times to reach the desired viscosity can vary greatly, from about 15 minutes to several hours, depending upon the strength and quantity of (C) the condensation catalysts employed. The emulsion so-formed is the silicone-based antifoam composition of the invention.

After the desired viscosity of the silicone-based antifoam composition of the invention has been reached, the second condensation catalyst (C) is preferably neutralized. In the event an acid condensation catalyst is employed, this neutralization may be carried out by the addition of any of a number of well-known bases, such as NaOH, KOH or amine-functional compounds, such as triethanolamine. Likewise, basic condensation catalysts may be neutralized by the addition of acids or even halosilanes. As used herein, the term "neutralizing" as applied to both the first and second catalysts, simply means that action of the condensation catalyst is hindered so that further condensation is no longer augmented thereby.

The present inventors have also discovered that a finely divided hydrophobic filler (E), may be added to the silicone-based antifoam composition of the invention. The finely divided hydrophobic filler may be added either before the reaction between components (A) and (B) is complete or even after the second catalyst (C) has been neutralized and the composition of the invention has reached the desired viscosity. Examples of hydrophobic finely divided fillers are well-known in the art and include precipitated and fumed silicas treated with hydrophobizicing agents such as polydimethylsiloxane, hexamethyldisilazane, hexamethyldisiloxane and halosilanes. Other hydrophobic finely divided fillers include waxes, such as ethylene bis-stearamide.

In order to more fully explain the advantages of the silicone-based antifoam compositions of the invention, examples thereof are set forth below. All references to parts are parts by weight.

REFERENCE EXAMPLE

An antifoam composition was prepared in accordance with the teachings of Aizawa et al. as follows: 295 parts of trimethylsily end-blocked polydimethylsiloxane having a viscosity of 1,000 m$^2$/sec at 25° C. and 14 parts of ethylpolysilicate (sold under the tradename Silicate 45 by Tama Kagaku Kogyp C. Of Japan) were heated and stirred until reaching a temperature of about 115° C. Thereafter, 5 parts of a potassium silanolate catalyst were added to and uniformly dispersed in the mixture. 141 parts of dimethylhydroxysilyl-terminated polydimethylsiloxane, having a viscosity of 2,000 mm$^2$/sec at 25° C., were then added and stirring and heating continued for several tens of minutes. 14 parts of precipitated silica (having a surface area of at least 200 m$^2$/g) were then added and dispersed by a homomixer, during which time the temperature was reduced to about 80° C. Next, 24 parts of dimethylhydroxysilyl-terminated polydimethylsiloxane, having a viscosity of 40 mm$^2$/sec at 25° C., were added and stirring and heating continued until the mixture reached a temperature of about 180° C. Additional catalyst, slightly less than 4 parts of potassium silanolate, was then introduced to the mixture and the temperature maintained for several hours, with constant stirring. Finally, the catalyst was neutralized by the introduction of carbon dioxide and the composition cooled to ambient temperature, which resulted in the silicone defoamer composition of Aizawa et al.

Comparative Example

Washing machine performance of the silicone defoamer composition of Reference Example 1 was measured as the foam height at the end of a 12 minute wash cycle in a Kenmore® washing machine using 112 g of a prototype heavy duty liquid detergent and 0.11 gram of the silicone defoamer of Reference Example 1. The prototype detergent included: 20 parts of alkyl ethoxy sulfate (34 parts Witcolate® LES 60C from Witco Corp., Organics Division, Greenwich, Conn.); 8 parts alkylpolyglucoside (16 parts Glucopon® 600 UP from Henkel Corp., Emory Group, Cincinnatti, Ohio); 3 parts alcohol ethoxylate (Neodal® 23-6.5 from Shell Chemical of Houston Tex.); 8 parts sodium citrate dihydrate (certified grade from Fisher Scientific of Pittsburgh, Pa.); 7 parts propylene glycol (USP/FCC grade, also from Fisher Scientific); 2 parts ethanolamine (laboratory grade, also from Fisher Scientific); 1 part fatty acid (Emery® 621 also from Henkel Corp., Emory Group); and 30 parts water. At the end of the 12 minute cycle, the foam height was 3.0 cm.

Example 1 of the Invention

To 10 parts the composition of Reference Example 1, the following was added: 40 parts of a dimethylhydroxysilyl-terminated polydimethylsiloxane (having a viscosity of 75 m$^2$/sec at 25° C.) ; 5 parts treated silica (Sipernat® D13, from Degussa Corp. of Ridgefield Park, N.J.)); 43 parts polyisobutylene (Indopol® 1-14H from Amoco Corp., Chicago, Ill.); and two parts oil-soluble dinonylnaphthalene sulfonic acid in heptane(Nacure® 1052 from King Industries, Norwalk, Conn.). The mixture was stirred and allowed to react for two hours at room temperature, until a viscosity of about 25,000 mm$^2$/sec was reached. The catalyst was then deactivated by the addition of triethanol amine. Thereafter, 0.11 g the resulting silicon-based antifoam composition so-formed was substituted for the silicone defoamer of Reference Example 1 and tested for washing machine performance in a manner identical to that set forth in Comparative Example 1. At the end of the 12 minute cycle, the foam height was 1.8 cm.

Example 2 of the Invention

A silicone-based antifoam composition was prepared in accordance with Example 1 of the Invention, except that 40 parts of a dimethylhydroxysilyl-terminated polydimethylsiloxane having a viscosity of 40 m$^2$/sec at 25° C. was substituted for the dimethylhydroxysilyl-terminated polydimethylsiloxane having a viscosity of 75 m$^2$/sec at 25° C. and the 5 parts treated silica (Sipernat® D13) was added after reaction to form the silicone-based antifoam composition. Washing machine performance was carried out with 0.11 g of the composition so-formed in a manner identical to Example 1 of the Invention. At the end of the 12 minute cycle, foam height was 1.7 cm.

Example 3 of the Invention

A silicone-based antifoam composition was prepared in accordance with Example 1 of the Invention, except that 2 parts of alkyl alryl sulfonic acid (C16–C24 benzene sulfonic acid derivatives, in particular Aristonic® H, from Pilot Chemical Co. of Santa Fe Springs, Calif.) was substituted for oil-soluble dinonylnaphthalene sulfonic acid catalyst. Washing machine performance was also carried out in accordance with Example 1 of the Invention and yielded a foam height of 1.0 cm after a 12 minute wash cycle.

Example 4 of the Invention

A silicone-based antifoam composition was prepared in accordance with Example 3 of the Invention, except that except that 40 parts of a dimethylhydroxysilyl-terminated polydimethylsiloxane having a viscosity of 40 m²/sec at 25° C. was substituted for the dimethylhydroxysilyl-terminated polydimethylsiloxane having a viscosity of 75 m²/sec at 25° C. and the 5 parts treated silica (Sipernat® D13) was added after reaction to form the silicone-based antifoam composition. Washing machine performance was carried out with 0.11 g of the composition so-formed in a manner identical to Example 1 of the Invention. At the end of the 12 minute cycle, foam height was 1.5 cm.

Example 5 of the Invention

A silicone-based antifoam composition was prepared in accordance with Example 1 of the Invention, except that 43 parts of mineral oil, having a viscosity of 3.6 m²/sec at 25° C. (Tufflo® Oil 35, from Lyondelle Petrochemical Co. of Houston, Tex.) was substituted for 43 parts polyisobutylene. Washing machine performance was carried out with 0.11 g of the composition so-formed in a manner identical to Example 1 of the Invention. At the end of the 12 minute cycle, foam height was 1.0 cm.

Example 6 of the Invention

A silicone-based antifoam composition was prepared in accordance with Example 1 of the Invention, except that 43 parts of odorless mineral spirits (from Ashland Chemical Co. of Columbus, Ohio) was substituted for 43 parts polyisobutylene. Washing machine performance was carried out with 0.11 g of the composition so-formed in a manner identical to Example 1 of the Invention. At the end of the 12 minute cycle, foam height was 0.75 cm.

Example 7 of the Invention

A silicone-based antifoam composition was prepared in accordance with Example 1 of the Invention, except that 43 parts of mineral oil, having a viscosity of 7 m²/sec at 25° C. (Duoprime® 55, from Lyondelle Petrochemical Co.) was substituted for 43 parts polyisobutylene. Washing machine performance was carried out with 0.11 g of the composition so-formed in a manner identical to Example 1 of the Invention. At the end of the 12 minute cycle, foam height was 1.5 cm.

From the preceding Examples of the Invention 1–7 and by way of comparison with the Comparative Example, it can be seen that the silicone-based antifoam compositions of the present invention offer superior foam control compared to that of the prior art.

The present inventors have also found that utilizing dimethylhydroxysilyl end-blocked polydimethylsiloxanes having a viscosity of up to 2,000 m²/sec at 25° C. as component (B) in the silicone-based antifoam compositions of the invention also produced highly effective foam control in the previously described washing machine performance evaluation. It was, however, noted that at viscosities in excess of about 2,000 m²/sec foam control efficacy suffered. Hence, for component (B) it is preferable to utilize polysiloxanes having viscosities below this limit.

The present inventors have also found that numerous types of condensation catalysts component (C) can be utilized. For instance, the composition of Example 2 of the Invention, made with 0.5 parts of $H_2SO_4$ instead of 2 parts oil-soluble dinonylnaphthalene sulfonic acid in heptane, produced 1.5 cm foam height at the end of the 12 minute wash cycle in the washing machine performance test. Likewise, the use of 0.5 parts of a C10–C16 alkyl benzene sulfonic acid (LAS-99, from Pilot Chemical Co.) instead of 2 parts oil-soluble dinonylnaphthalene sulfonic acid in heptane in the composition of Example 2, yielded a silicone-based antifoam composition that produced a foam height of only 1.0 cm in the washing machine performance test.

The silicone-based antifoam compositions of the present invention have been illustrated by way of example in order to more fully set forth the novel features and advantages thereof. The scope of the present invention should not, however, be so-limited and should be judged only in accordance with the following claims and equivalents thereof.

What is claimed is:

1. A silicone-based antifoam composition in the form of an emulsion, said emulsion having a dispersed phase and a continuous phase, said dispersed phase being a secondary silicone composition and said continuous phase being a nonpolar organic medium selected from the group consisting of polyisobutylene and mineral oil, said emulsion being prepared by reacting components comprising:

(A) about 5 to 25 weight parts, of a primary silicone composition; and
   (B) about 10 to 50 weight parts of a polydiorganosiloxane having condensable terminal groups and a viscosity of about 10 to 50,000 mm²/sec at 25° C., in the presence of;
   (C) a catalytic amount of a second condensation catalyst;
   said primary silicone composition (A), said polydiorganosiloxane (B) and said second condensation catalyst (C) being dispersed in about 25 to 80 weight parts of (D) a nonpolar organic medium selected from the group consisting of polyisobutylene and mineral oil, per 100 parts of the combined weights of (A), (B) and (D), during said reacting step;
   said reacting step forming said secondary silicone composition of said dispersed phase;
   said primary silicone composition being the reaction product, formed at a temperature of 50° C. to 300° C., of a mixture comprising:
   (i) 1 to 100 parts by weight of a diluent selected from the group consisting of polydiorganosiloxane, polyisobutylene and mineral oil;
   (ii) 5 to 100 parts by weight of a polyorganosiloxane having a viscosity of 200 to about 100 million mm²/s at 25° C. expressed by the general formula $R^1_a(R^2O)_bSiO_{(4-a-b)/2}$ in which $R^1$ is a monovalent hydrocarbon or halogenated hydrocarbon group having 1 to 10 carbon atoms, $R^2$ is hydrogen or a monovalent hydrocarbon group having 1 to 10 carbon atoms, a has an average value of 1.9 to 2.2 and b has a sufficiently large value to give at least one —$OR^2$ group in each molecule, at least one such —$OR^2$ group being present at the end of the molecular chain;
   (iii) 0.5 to 20 parts by weight for every 100 parts by weight of the combined weight of components (i) and (ii) of at least one silicon compound selected from the group consisting of
      (a) an organosilicon compound of the general formula $R^3_cSiX_{4-c}$ in which $R^3$ is a monovalent hydrocarbon group having 1 to 5 carbon atoms, X is selected from a halogen atom or a hydrolyzable group and c has an average value of one or less,
      (b) a partially hydrolyzed condensate of said compound (a), (c) a siloxane resin comprising $(CH_3)_3SiO_{1/2}$ units and $SiO_{4/2}$ units wherein the ratio of $(CH_3)_3SiO_{1/2}$ units to $SiO_{4/2}$ units is 0.4:1 to 1.2:1, or (d) a condensate of said compound (c) with said compound (a) or (b); and (iv) a catalytic amount of a first condensation catalyst.

2. A composition in accordance with claim 1 wherein said (A) primary silicone composition further comprises (v) 0.5 to 30 parts by weight of a finely divided filler for every 100 parts by weight of the combined weight of components (i) and (ii).

3. A composition in accordance with claim 2 wherein said (A) primary silicone composition further comprises (vi) 1 to 20 parts by weight for every 100 parts by weight of the combined weight of components (i) and (ii) of a polyorganosiloxane having a viscosity of 5 to about 200 mm$^2$/s at 25° C. expressed by the general formula $R^4_e(R^5O)_fSiO_{(4-e-f)/2}$ in which $R^4$ is a monovalent hydrocarbon or halogenated hydrocarbon group having 1 to 10 carbon atoms, $R^5$ is hydrogen or a monovalent hydrocarbon group having 1 to 10 carbon atoms, e has an average value of 1.9 to 2.2 and f has a sufficiently large value to give at least two —OR$^5$ groups in each molecule at the end of a molecular chain.

4. A composition in accordance with claim 1 wherein said reacting step of components (A), (B) and (C) is carried out at room temperature.

5. A composition in accordance with claim 1 wherein said silicone-based antifoam composition has a viscosity between about 10,000 and 30,000 mm$^2$/sec.

6. A composition in accordance with claim 5 wherein said second catalyst (C) is neutralized after said reacting step of components (A), (B) and (C).

7. A composition in accordance with claim 1 wherein component (C), said second condensation catalyst, is a surface active catalyst.

8. A composition in accordance with claim 1 wherein said catalytic amount of component (C) said second catalyst is between about 0.5 and 2.0 weight percent of the combined weights of components (A), (B) and (D).

9. A composition in accordance with claim 1 wherein component (B) has a viscosity between about 20 and 2,000 mm$^2$/sec.

10. A composition in accordance with claim 1 further comprising (E) a finely divided hydrophobic filler.

11. A method of preparing a silicone based antifoam in the form of an emulsion, said emulsion having a dispersed phase and a continuous phase, said dispersed phase being a secondary silicone composition and said continuous phase being a nonpolar organic medium selected from the group consisting of polyisobutylene and mineral oil, said method comprising the steps of:

(I) preparing a primary silicone composition (A) by 1. reacting, at a temperature of 50° C. to 300° C., a mixture comprising:
    (i) 1 to 100 parts by weight of a diluent selected from the group consisting of polydiorganosiloxane, polyisobutylene and mineral oil;
    (ii) 5 to 100 parts by weight of a polyorganosiloxane having a viscosity of 200 to about 100 million mm$^2$/s at 25° C. expressed by the general formula $R^1_a(R^2O)_bSiO_{(4-a-b)/2}$ in which $R^1$ is a monovalent hydrocarbon or halogenated hydrocarbon group having 1 to 10 carbon atoms, $R^2$ is hydrogen or a monovalent hydrocarbon group having 1 to 10 carbon atoms, a has an average value of 1.9 to 2.2 and b has a sufficiently large value to give at least one —OR$^2$ group in each molecule, at least one such —OR$^2$ group being present at the end of the molecular chain;

(iii) 0.5 to 20 parts by weight for every 100 parts by weight of the combined weight of components (i) and (ii) of at least one silicon compound selected from the group consisting of
        (a) an organosilicon compound of the general formula $R^3_cSiX_{4-c}$ in which $R^3$ is a monovalent hydrocarbon group having 1 to 5 carbon atoms, X is selected from a halogen atom or a hydrolyzable group and c has an average value of one or less,
        (b) a partially hydrolyzed condensate of said compound (a),
        (c) a siloxane resin comprising $(CH_3)_3SiO_{1/2}$ units and $SiO_{4/2}$ units wherein the ratio of $(CH_3)_3SiO_{1/2}$ units to $SiO_{4/2}$ units is 0.4:1 to 1.2:1, or
        (d) a condensate of said compound (c) with said compound (a) or (b);

(iv) a catalytic amount of a first condensation catalyst; and 2. neutralizing the first condensation catalyst; (II) mixing, under conditions of shear, the components comprising:

(A) about 5 to 25 weight parts of the primary silicone composition prepared in step (I);

(B) about 10 to 50 weight parts of a polydiorganosiloxane having condensable terminal groups and a viscosity of about 10 to 50,000 mm$^2$/sec at 25° C., in the presence of (C) a catalytic amount of a second condensation catalyst;

(D) about 25 to 80 weight parts of a nonpolar organic medium selected from the group consisting of polyisobutylene and mineral oil, per 100 parts of the combined weights of (A), (B) and (D);

said mixing step (II) causing reaction between components (A) and (B), thus forming said secondary silicone composition of said dispersed phase of said emulsion;

said nonpolar organic medium form said continuous phase of said emulsion.

12. A method in accordance with claim 11 further comprising the step of (III) neutralizing said second condensation catalyst (C) after said emulsion reaches a viscosity between about 10,000 and 30,000 mm$^2$/sec.

* * * * *